United States Patent [19]

Knudson et al.

[11] Patent Number: 5,266,538

[45] Date of Patent: Nov. 30, 1993

[54] METHOD FOR PREPARING HIGH SOLIDS BENTONITE SLURRIES

[75] Inventors: Milburn I. Knudson; Paul Carroll; David J. Hanlon; William R. Menking; Patricia M. Lewis, all of Gonzales, Tex.

[73] Assignee: Southern Clay Products, Inc., Gonzales, Tex.

[21] Appl. No.: 631,919

[22] Filed: Dec. 21, 1990

[51] Int. Cl.$^5$ .................. C04B 33/02; C04B 33/04
[52] U.S. Cl. .................. 501/147; 501/144; 501/145; 501/146; 106/416; 106/486; 106/DIG. 4
[58] Field of Search ......... 106/802, 811, 400, DIG. 4, 106/416, 486; 252/8.551; 166/285, 292, 293; 501/144, 145, 148, 147, 146

[56] References Cited

U.S. PATENT DOCUMENTS

| | | | |
|---|---|---|---|
| 2,552,775 | 5/1951 | Fischer et al. | 526/240 |
| 3,371,988 | 3/1968 | Naynard et al. | 501/146 |
| 3,509,066 | 4/1970 | Jacobs et al. | 501/147 |
| 3,846,147 | 11/1974 | Tapper | 501/147 |
| 3,865,240 | 2/1975 | Schick | 106/DIG. 4 |
| 4,053,324 | 11/1977 | Haden, Jr. et al. | 427/146 |
| 4,118,246 | 10/1978 | Horzepa et al. | 106/416 |
| 4,131,476 | 12/1978 | Melcher et al. | 106/38.3 |
| 4,144,085 | 3/1979 | Abercrombie, Jr. | 106/416 |
| 4,202,413 | 5/1980 | Messenger | 166/292 |
| 4,267,062 | 5/1981 | Byerley | 166/305 R |
| 4,359,339 | 11/1982 | Van Fisk, Jr. | 106/38.3 |
| 4,569,923 | 2/1986 | Knudson, Jr. et al. | 501/148 |
| 4,600,515 | 7/1986 | Gleason et al. | 507/120 |
| 4,613,542 | 9/1986 | Alexander | 428/290 |
| 4,624,982 | 11/1986 | Alexander | 524/446 |
| 4,631,091 | 12/1986 | Goodman | 501/145 |
| 4,742,098 | 5/1988 | Finlayson et al. | 523/514 |
| 4,836,946 | 6/1989 | Dixit | 252/97 |
| 5,028,268 | 7/1991 | Ince et al. | 106/416 |

FOREIGN PATENT DOCUMENTS

0485124A1 5/1992 European Pat. Off. .
64-45754 2/1989 Japan .

OTHER PUBLICATIONS

"Production and Control of Properties of Highly Concentrated Clay Suspension", CA72:5607z, Sych, B.I. (USSR); *Vsin. Kharkov, Politekh, Insi.* 1968, No. 26 pp. 23–28 (Russ)

"Changes in the Swelling of Bentonite under the Effect of Some Inhibiting Additives", CA89:10950m, Gorodnov, V. D. (USSR); *Dispersyne Siat. Buren* 1977, pp. 84–86 (Russ).

*Primary Examiner*—Mark L. Bell
*Assistant Examiner*—Michael A. Marcheschi
*Attorney, Agent, or Firm*—Klauber & Jackson

[57] ABSTRACT

A smectite clay is provided as an elevated solids aqueous slurry e.g. up to 50% solids, which is composed of the smectite clay slurried or dispersed in water containing an effective concentration of a monovalent salt. When such a salt is present in the clay slurry, the clay does not swell appreciably, is essentially inactive, and the slurry can be shipped and stored without creating a gelling problem. When this slurry is diluted with fresh water at the point of application to make it of the desired solids content for use, the smectite clay is activated and exhibits the desired properties, such as viscosity, retention, etc.

17 Claims, No Drawings

1

METHOD FOR PREPARING HIGH SOLIDS BENTONITE SLURRIES

FIELD OF THE INVENTION

This invention relates to smectite clay (also called bentonite clay), and is more particularly concerned with smectite clay slurries of elevated solids content.

BACKGROUND OF THE INVENTION

Smectite clay is a commercially important mineral. With the appropriate processing, smectite clays are excellent viscosifiers, binders, film formers, fabric softeners and retention aid additives in paper making. These clays are platey-type materials having a micaceous structure. They are highly colloidal and readily swell in water to form viscous, thixotropic gels which renders these clays useful as viscosity builders in many industries and applications including, for example, in foundry molding compositions, as suspension aids in agricultural sprays, and for thickening cosmetics. The high surface area generated by swelling in water also makes these clays useful in fabric softening and paper making applications.

Most smectite clays are sold as fine powders. As with most minerals, however, these powders are difficult and expensive to handle. They also are subject to considerable "dusting," i.e. evolution of dust during handling, so that they can, in some cases, cause environmental problems, and even health risks. To minimize these problems, many minerals are sold by the manufacturer as high solids aqueous slurries. Such high solids slurries can be easily stored, shipped, transferred, e.g. pumped and metered, with significantly less capital expenditure and many fewer problems than are associated with mineral dusts, as mentioned above.

In most applications, nevertheless, it is not economical to ship smectite clay slurries because of the large quantity of water present in shippable slurries. Since smectites are indeed good viscosifiers, it is not possible to produce high solid slurries by the usual methods. In general, only about 8% -10% solids slurries of good quality swelling smectite can be produced in water. Indeed, at solids contents greater than about 8%, the viscosities of the slurries can become so high that they cannot readily be pumped by conventional equipment and gelling upon standing becomes a problem. At higher solids it becomes virtually impossible to form a uniform paste without special equipment.

Thus, there is a need for slurries containing substantially greater than 8% by weight of clay, which have viscosities low enough to allow pumping. In addition, the more clay which can be incorporated into the slurry the more economical it is to ship the clay since the total weight of the slurry will include less water weight.

Van Fisk, U.S. Pat. No. 4,359,339 proposes the addition of water soluble aluminum salt, such as aluminum sulfate, to permit the making of pumpable aqueous slurries of bentonite of up to 26% by weight of clay, primarily for use in making foundry sand compositions used in the making of molds. While apparently suitable for the purpose disclosed, aluminum salts have not been found to be satisfactory for making clay slurries of higher solids content, which are frequently desired for many purposes, especially when shipping is involved. Van Fisk also points out that certain other ions, such as calcium ion have been known to depress the gelling properties of bentonites in aqueous slurries, but that the properties are not readily reversible upon later dilution, thus limiting the value of such use. While aluminum ion appears to be less subject to this objection, to a considerable extent it suffers from the same problem. All multivalent cations tend to strongly bind the clay platelets together, which prevents dispersion and inhibits performance in applications where good dispersion is needed (viscosifiers, fabric softeners, retention aids).

In accordance with the foregoing, it may be regarded as an object of the present invention, to provide a method for preparing a time-stable low viscosity, high solids aqueous bentonite slurry.

It is a further object of the invention to provide a method as aforementioned, wherein the bentonite in the resultant slurry, upon dilution in the fresh water at the point of use, can be easily dispersed to generate the large surface area needed for maximum performance in many applications.

It is a further object of the present invention to provide an improved smectite clay slurry of increased solids content.

It is a still further object of the invention to provide a smectite clay slurry of the character indicated which remains pumpable and shippable without prohibitive gelling even at elevated solids content.

SUMMARY OF THE INVENTION

In accordance with the invention, smectite clay, (also called bentonite clay) is provided as an elevated solids aqueous slurry e.g. up to 50% solids, which comprises smectite clay slurried or dispersed in an aqueous medium wherein the aqueous medium has an effective concentration of a salt wherein the cation is monovalent. When such a salt is present in the clay slurry, the clay does not swell appreciably, is essentially inactive, and the slurry can be shipped and stored without creating a gelling problem. When this slurry is diluted with fresh water at the point of application to make it of the desired solids content for use, e.g. even to 1% solids, the smectite clay exhibits all of the desired properties, such as fabric softening, retention, etc. in most applications.

In a preferable procedure pursuant to the method of the invention, a time-stable, low viscosity, high solids aqueous bentonite slurry is prepared by the steps of first preparing an aqueous solution of a monovalent salt; and thereupon dispersing in the solution at least 8% by weight of a powdered bentonite, by adding said powder to said solution with concurrent low shear mixing. The bentonite is preferably a sodium bentonite, which is added to the solution as from 8 to 50% by weight. The monovalent salt may comprise from about 1 to 35% by weight of the solution, and preferably comprises from 3 to 15%. The monovalent salt is preferably sodium chloride. The salt and clay can also be added to the aqueous phase at the same time. This gives a significant improvement over adding salt to a dispersed clay slurry but is not as effective as dissolving the salt first, then adding the clay.

DETAILED DESCRIPTION OF THE INVENTION

In accordance with the invention, relatively stable, concentrated aqueous slurries of smectite clays, can be made with solids contents up to 50% for efficient transportation. Slurries of lower solids contents are usually used, e.g. for many of the uses enumerated above, and these can be prepared merely by diluting the concentrated slurries with fresh water to the desired extent. Upon such dilution, gelling properties and other useful characteristics of the bentonites develop, i.e. the bentonite is "activated" as to have its more normal properties in the presence of water. As with most smectite slurries, shearing can increase the degree of dispersion in the diluted slurries, hence the ultimate performance.

The salt employed is, as mentioned, a salt in which the cation is monovalent. Preferred are alkali metal salts, such as sodium salts, and particularly preferred is sodium chloride, i.e. "common salt."

Conventionally, smectite clays, such as bentonite, after mining, are dried to less than about 10% moisture and pulverized. To make a dispersion or slurry, the powdered clay is dispersed in water with rapid agitation.

In accordance with the preferred process aspects of the present invention, the powdered clay in the desired amount is added to a previously prepared aqueous solution of the monovalent cation salt. For best results the water contains sodium chloride in a concentration of about 1 to 35% by weight, preferably from about 5 to about 15% by weight.

The clay-salt solution mixture is agitated with minimum shear——preferably as the clay is added. It has been found that the lower the shear of mixing, the higher the solids content that can be reached. Any mixing device capable of producing low-shear mixing can be employed. Particularly effective has been found to be the well-known "Lightnin" stirrer. Various paddle wheel mixers are also suitable.

Non-aqueous media can also be present, but the nonaqueous media remains after dilution for ultimate use and this may be a problem for some applications. It is preferred, therefore, that the monovalent cation salt-containing media into which the clay is slurried be wholly aqueous.

The following Examples will serve to illustrate and provide a fuller understanding of the invention.

EXAMPLE 1

A sodium bentonite in powder form was added to a 15% aqueous sodium chloride solution to provide slurries of various bentonite solids content. The solution was made up by dissolving 300 parts of sodium chloride in 1700 parts of deionized water to give 2000 parts of solution. A 10% slurry of the bentonite in deionized water was also made as a control. Each slurry was mixed in a Lightnin mixer for 15 minutes.

The initial Brookfield viscosity was measured for each slurry at 20 RPM and 50 RPM.

The following Table 1 shows the results of the evaluation of the slurries After these slurries were allowed to stand for one day, viscosity measurements were again taken, with the results as set forth in Table 2. After the slurries were allowed to stand for one week, viscosity measurements were again taken with the results shown in Table 3.

TABLE 1

| Smectite Solids with NaCl (15% solution) | Viscosity (cps) 20 RPM | Viscosity (cps) 50 RPM |
| --- | --- | --- |
| 5% | No viscosity registered | Settlement after three minutes |
| 10% | No viscosity registered | Settlement after three minutes |
| 20% | 100 | 60 |
| 32% | 740 | 840 |
| 10%* | 9000 | 3840 |

*deionized water slurry, no NaCl.

TABLE 2

| Smectite Solids with NaCl (15% solution) | Visc.(cps) 20 RPM | Visc.(cps) 50 RPM |
| --- | --- | --- |
| 5% | — | — |
| 10% | — | — |
| 20% | 300 | 220 |
| 32% | 3400 | 1460 |
| 10%* | 13,250 | 6200 |

*deionized water slurry, no NaCl.

TABLE 3

| Smectite Solids with NaCl (15% solution) | Visc.(cps) 20 RPM | Visc.(cps) 50 RPM |
| --- | --- | --- |
| 5% | — | — |
| 10% | — | — |
| 20% | 325 | 120 |
| 32% | 1700 | 780 |
| 10%* | 15150 | 4900 |

*deionized water slurry, no NaCl.

EXAMPLE 2

Example I was repeated except that only a 30% bentonite slurry was made and tested, but the aqueous NaCl solutions of concentrations of 5%, 7.5%, 10% and 12.5% NaCl were employed.

Table 4 illustrates that there is some viscosity increase upon standing but even after a week this is substantially less than the viscosity obtained without the use of salt. In fact, it is impossible to make a 30% slurry from this smectite without salt. It will also be noted that not only the initial viscosity but the percentage of viscosity increase decreases as the NaCl concentration in the aqueous medium increases. In other words, viscosity can be controlled by the amount of clay solids or by the level of NaCl. Also to be noted is that there is some solids separation which, tends to decrease as the solids content increases. However, this is a small, soft sediment which can be redispersed with minimum agitation.

TABLE 4

| | Brookfield Viscosity | | | | | | | |
| | INITIAL | | 1 DAY | | | 1 WEEK | | |
| SAMPLE | 20 rpm | 50 rpm | 20 rpm | 50 rpm | mm SEP. | 20 rpm | 50 rpm | mm SEP. |
| --- | --- | --- | --- | --- | --- | --- | --- | --- |
| 5% NaCl 30% Solids | 7500 | 3080 | 13500 | 6100 | 0 | 14000 | 5000 | 0 |
| 7.5% NaCl | 3075 | 1390 | 2100 | 980 | 0.5 | 6400 | 2460 | 4 |

TABLE 4-continued

| SAMPLE | Brookfield Viscosity | | | | | | | |
|---|---|---|---|---|---|---|---|---|
| | INITIAL | | 1 DAY | | | 1 WEEK | | |
| | 20 rpm | 50 rpm | 20 rpm | 50 rpm | mm SEP. | 20 rpm | 50 rpm | mm SEP. |
| 30% Solids 10% NaCl | 1575 | 680 | 1650 | 930 | 4 | 3050 | 1480 | 11 |
| 30% Solids 12.5% NaCl 30% Solid | 1350 | 600 | 2450 | 1150 | 4 | 750 | 230 | 14 |

EXAMPLE 3

Slurries containing 25% smectite with either 10% or 20% (based on clay weight) salt were made by the incorporation procedure used in Example 1. In this case, several different salts were used. After the slurries were prepared, viscosities were measured with a Brookfield viscometer at 20 RPM. After 24 hours, a clear upper liquid layer formed in some of the slurries. The depth of this layer was measured and reported in millimeters The slurries were also tested at this time for flowability In this test the jar containing the slurry was turned on its side. If the slurry flowed out of the jar it was rated "OK." If the slurry did not flow it was rated "Gel."

After the flowability test, each slurry was diluted to 5% solids with salt free water and sheared in a Waring blender for 15 minutes The 20 RPM Brookfield viscosity was again recorded. These slurries were then tested for their ability to improve water release from paper pulp slurries used in paper making. This technology is described in U.S. Pat. No. 4,305,781. In this test, the shorter the drainage time (in seconds) the better.

The results of these experiments are given in Table 5. The optimum slurry would give low viscosity, low liquid separation and good flowability at high solids. Upon dilution for use in commercial applications, the optimum slurry would give high viscosity at 5% solids for rheological application and low drainage rate numbers for paper making applications.

It can be seen from this data that, overall, the monovalent cations tend to be better than calcium and that sodium is better than Li or K. Multivalent cations such as calcium are good at producing the initial high solids slurries, but they also interfere with many of the application properties of smectites. Lithium performs fairly well but is a potential health hazard. Potassium, although monovalent, happens to be of the specific size to complex strongly with the surface of many smectites. This complexation is detrimental to many of the commercial applications of smectites. Overall the preferred salt is sodium chloride. In applications where the chloride ion is a problem, such as corrosion sensitive systems, one of the other salts could be chosen.

TABLE 5

| | | 25% CLAY SLURRIES | | | | |
|---|---|---|---|---|---|---|
| SALT | % SALT[1] | 20 RPM BKFD.(CPS) | SEPARATION mm | FLOW 24 HR. | 5% SOLIDS VISCOSITY[2] | DRAINAGE TIME |
| CaCl$_2$ | 10 | 950 | 4 | OK | — | — |
| | 20 | 700 | 5 | OK | 25 | 74 |
| K$_2$CO$_3$ | 10 | 490 | 8 | OK | — | — |
| | 20 | 230 | 14 | OK | 10 | — |
| KCl | 10 | 230 | 13 | OK | — | — |
| | 20 | 120 | 15 | OK | 5 | 62 |
| LiCl | 10 | 13250 | 0 | Gel | — | — |
| | 20 | 410 | 8 | OK | 1950 | 47 |
| Na$_2$CO$_3$ | 10 | 20500 | 0 | Gel | — | — |
| | 20 | 5200 | 0 | Gel | — | — |
| Na$_2$SO$_4$ | 10 | 4750 | 0 | Gel | — | — |
| | 20 | 4750 | 0 | Gel | — | — |
| Na Citrate | 10 | 40000 | 0 | Gel | — | — |
| | 20 | 5500 | 0 | Gel | 140 | 47 |
| NaCl | 10 | 2800 | 0 | OK | — | — |
| | 20 | 425 | 8 | OK | 1225 | 48 |
| NaNO$_3$ | 10 | 14000 | 0 | OK | — | — |
| | 20 | 1700 | 2 | Gel | 1350 | 47 |
| Control | 0 | NA | NA | NA | 125 | 48 |

[1]Based on dry weight of clay used.
[2]20 RPM Brookfield after dilution and shearing in Waring Blender. Control made directly to 5% (cps).

EXAMPLE 4

Slurries were made in the same manner as in Example 3, except the clay solids were increased to 30% and the salts were added at 20% of the weight of the smectite clay. The data on these high solids slurries are given in Table 6.

TABLE 6

| | 30% CLAY SLURRIES | | | |
|---|---|---|---|---|
| SALT | [1]% SALT | 20 RPM BKFD.(CPS) | SEPARATION mm | FLOW 24 HR. |
| CaCl$_2$ | 20 | 4,400 | 0 | OK |
| K$_2$CO$_3$ | 20 | 1,100 | 7 | OK |
| KCl | 20 | 490 | 12 | OK |
| NaCl | 20 | 2,800 | 3 | OK |

[1]Based on dry weight of clay used

EXAMPLE 5

Dispersants are often used to reduce the viscosity of smectite slurries. Table 7 compares the effect of a dispersant on the viscosity of a smectite slurry, as a function of smectite solids in the slurry and the order of addition of the dispersant. In this study tetrasodium pyrophosphate was used as the dispersant.

Without any dispersant, the maximum obtainable solids is between 13 and 15%. When dispersant and clay are added together, the solids can be increased to somewhat less than 20%. When the dispersant is fully dispersed in the water first, solids in excess of 20% can be achieved. Even though the maximum achievable solids can be increased with a dispersant, the effectiveness is much inferior to the previous examples. This is true even when a sodium containing dispersant is used and is added to the water prior to the smectite. This is because the dispersant end of the molecule, in this case the pyrophosphate, tends to disperse loose aggregates of smectite even when the intercrystalline region cannot swell. This leads to an increase in viscosity of the slurry relative to other sodium salts.

TABLE 7

| VISCOSITY, 20 RPM BROOKFIELD (CPS) | | | |
|---|---|---|---|
| % SOLIDS | A | B | C |
| 5.0 | 125 | — | — |
| 7.5 | 1025 | 25 | 25 |
| 10.0 | 4400 | 100 | 75 |
| 13.2 | 15000 | — | — |
| 15.0 | Too Thick | 2950 | 1650 |
| 16.0 | — | 4000 | 2500 |
| 17.5 | — | 10000 | 4000 |
| 20.0 | — | Too Thick | 9750 |

A - No TSPP addition
B - 10% TSPP added to clay
C - 10% TSPP added to water

EXAMPLE 6

In some cases, acceptable high solids smectite slurries can be made without dissolving all the salt in the water before adding clay. In this Example, smectite granules were prepared (via granulation) in which the salt was incorporated into the granule, i.e. the granules were compounded to include each component. When these granules were dispersed in fresh water with low shear, reasonably high solids were obtained. This is apparently due to the fact that the salt is dissolving faster than the clay is being dispersed. The results are shown in Table 8. The use of salt/smectite granules can be useful in situations where the smectite processing facility is in a different location than the slurry production equipment. The granules generate fewer problems than just shipping powder.

TABLE 8

| VISCOSITY CPS (20 AND 50 RPM)[1] | | | | | | | | | | | | |
|---|---|---|---|---|---|---|---|---|---|---|---|---|
| [2]% SOLIDS→ | 5 | 5 | 7 | 7 | 8.5 | 8.5 | 10 | 10 | 15 | 15 | 17 | 17 |
| [3]SMECTITE GRANULE WITH: | | | | | | | | | | | | |
| 18.9% Sodium Chloride | 20 | 24 | 87 | 44 | — | — | 280 | 44 | 640 | 308 | 740 | 360 |
| 24.6% Sodium Acetate | 60 | 36 | 200 | 112 | — | — | 775 | 320 | 2000 | 980 | 2100 | 1200 |
| 25.3% Sodium Nitrate | 30 | 55 | 120 | 64 | — | — | 400 | 210 | 950 | 480 | — | — |
| 22.1% Sodium Sulfate | 40 | 28 | 160 | 84 | 410 | 216 | 750 | 384 | 4000 | 2000 | 8500 | 3600 |
| 27.7% Sodium EDTA | 10 | 16 | 20 | 24 | — | — | 100 | 72 | 1600 | 880 | — | — |
| 28.7% Potassium Nitrate | 5 | 12 | 5 | 12 | — | — | 10 | 12 | 10 | 14 | — | — |
| 22.9% Potassium Chloride | 5 | 10 | 6 | 10 | — | — | 10 | 12 | 10 | 12 | — | — |
| Control (SCPX-430 Clay)* | 20 | 32 | 90 | 92 | 750 | 550 | — | — | — | — | — | — |
| [2]% SOLIDS→ | 20 | 20 | 25 | 25 | 30 | 30 | 40 | 40 | 50 | 50 | | |
| [3]SMECTITE GRANULE WITH: | | | | | | | | | | | | |
| 18.9% Sodium Chloride | 1025 | 465 | 1600 | 680 | — | — | — | — | — | — | | |
| 24.6% Sodium Acetate | 2800 | 1200 | — | — | — | — | — | — | — | — | | |
| 25.3% Sodium Nitrate | 1700 | 800 | 3500 | 1700 | — | — | — | — | — | — | | |
| 22.1% Sodium Sulfate | — | — | — | — | — | — | — | — | — | — | | |
| 27.7% Sodium EDTA | 3000 | 2600 | — | — | — | — | — | — | — | — | | |
| 28.7% Potassium Nitrate | 20 | 16 | 60 | 32 | 750 | 290 | 5200 | 2160 | 51000 | 23600 | | |
| 22.9% Potassium Chloride | 30 | 20 | 60 | 32 | 350 | 160 | 1650 | 720 | 6250 | 5200 | | |
| Control (SCPX-430 Clay)* | — | — | — | — | — | — | — | — | — | — | | |

*sodium bentonite
NOTES:
[1]Granules were slurried in a 500 ml beaker for 15 minutes with a 15/16" - 3 blade propeller at 800 rpm for a total 400 gm slurry weight.
[2]Includes weight of dry clay plus salt
[3]All salt percentages based on dry smectite weight While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto

What is claimed is:

1. A method for preparing a time-stable, low viscosity, high solids aqueous bentonite slurry, comprising:
preparing an aqueous solution of a non-dispersant salt of a monovalent cation wherein said salt comprises 1 to 35% by weight of said solution, and dispersing therein at least 8% by weight of a powdered bentonite, by low shear intermixing of said powder with said solution; said salt being effective to prevent the said bentonite from swelling appreciably, whereby the slurry can be shipped and stored without creating a gelling problem; and the inhibiting effect of said salt on said swelling of the bentonite and gelling of said slurry being reversible upon subsequent dilution with water.

2. A method in accordance with claim 1, wherein said aqueous salt solution is prepared as an initial step, and said bentonite powder is then added to said solution with concurrent low shear mixing.

3. A method in accordance with claim 1, wherein said preparation of said aqueous salt solution and said dispersion of said bentonite are carried out as substantially simultaneous steps.

4. A method in accordance with claim 2, wherein said bentonite is a sodium bentonite, which is added to said solution as from 8 to 50% by weight.

5. A method in accordance with claim 4, wherein said sodium bentonite is added in the range of from 15 to 40% by weight.

6. A method in accordance with claim 4, wherein said salt comprises 5 to 15% by weight of said solution.

7. A method in accordance with claim 4, wherein said salt comprises sodium chloride.

8. A method in accordance with claim 3, wherein said salt and said bentonite are added to the water phase of said slurry as compounded granules.

9. A method for shipping a bentonite from a manufacturing point to a utilization point, and providing at the utilization point an aqueous swelled bentonite slurry; comprising the steps of preparing at said manufacturing point, a high solids, low viscosity slurry comprising an aqueous solution of 1 to 35% by weight of solution of a non-dispersant salt of a monovalent cation, in which is dispersed at least 8% by weight of a powdered bentonite; said salt being effective to prevent the said bentonite from swelling appreciably, whereby the slurry can be shipped and stored without creating a gelling problem; the inhibiting effect of said salt on said swelling of the bentonite and gelling of said slurry being reversible upon subsequent dilution with water; shipping said slurry to the said utilization point; and activating and swelling the bentonite at the utilization point by diluting the high solids slurry with fresh water.

10. A method in accordance with claim 9, wherein said bentonite is a sodium bentonite, which is present in the high solids slurry as from 8 to 50% by weight.

11. A method in accordance with claim 10, wherein the dilution of the high solids slurry at the utilization point brings said clay solids to as low as 1%.

12. A method in accordance with claim 10, wherein said sodium bentonite is present in the range of from 15 to 40% by weight.

13. A method in accordance with claim 12, wherein said salt comprises sodium chloride in an amount of from 5 to 15% by weight of said aqueous solution.

14. An aqueous slurry of smectite clay of elevated solids content, comprising an aqueous solution of 1 to 35% by weight of said solution of a non-dispersant salt of a monovalent cation, in which is dispersed from about 8 to 50% by weight of said slurry, of a smectite from swelling appreciably, whereby the slurry can be shipped and stored without crating a gelling problem; and the inhibiting effect of said salt on said swelling of the bentonite and on gelling of said slurry being reversible upon subsequent dilution with water.

15. An aqueous slurry as defined in claim 14, wherein the smectite clay is a bentonite.

16. An aqueous slurry as defined in claim 14, wherein said salt is in alkali metal salt.

17. An aqueous slurry as defined in claim 14, wherein said salt is sodium chloride, which comprises from about 1% to 15% by weight of the aqueous solution.

* * * * *